(12) United States Patent
Sakai

(10) Patent No.: US 11,848,728 B2
(45) Date of Patent: Dec. 19, 2023

(54) COMMUNICATION DEVICE AND PROGRAM STORAGE MEDIUM

(71) Applicant: Mitsubishi Electric Corporation, Tokyo (JP)

(72) Inventor: Manabu Sakai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 151 days.

(21) Appl. No.: 17/672,259

(22) Filed: Feb. 15, 2022

(65) Prior Publication Data

US 2022/0173775 A1    Jun. 2, 2022

Related U.S. Application Data

(63) Continuation of application No. PCT/JP2019/039164, filed on Oct. 3, 2019.

(51) Int. Cl.
| | | |
|---|---|---|
| *H04L 23/02* | (2006.01) | |
| *H04B 7/0456* | (2017.01) | |
| *H04B 7/06* | (2006.01) | |
| *H04B 7/08* | (2006.01) | |
| *H04L 5/14* | (2006.01) | |

(52) U.S. Cl.
CPC ......... *H04B 7/0456* (2013.01); *H04B 7/0608* (2013.01); *H04B 7/0891* (2013.01); *H04L 5/14* (2013.01)

(58) Field of Classification Search
CPC .......... H01Q 21/00; H01Q 3/267; H01Q 3/30; H04B 7/0617; H04B 7/0413; H04B 7/00; H04B 7/0695; H04L 25/0328; H04L 7/03891; H04L 27/366; H04J 14/04

USPC ......................................... 375/262, 260, 267
See application file for complete search history.

(56) References Cited

U.S. PATENT DOCUMENTS

| | | | |
|---|---|---|---|
| 11,646,860 B2* | 5/2023 | Gulati | ................ H04L 5/1461 370/277 |
| 2016/0127073 A1 | 5/2016 | Ashrafi et al. | |
| 2016/0233903 A1* | 8/2016 | Wu | ........................ H04L 69/22 |

(Continued)

FOREIGN PATENT DOCUMENTS

| | | |
|---|---|---|
| CN | 104168052 B | 11/2015 |
| JP | 2015-207799 A | 11/2015 |

(Continued)

OTHER PUBLICATIONS

Extended European Search Report for European Application No. 19947612.8, dated Sep. 5, 2022.

(Continued)

Primary Examiner — Khai Tran
(74) Attorney, Agent, or Firm — Birch, Stewart, Kolasch & Birch, LLP

(57) ABSTRACT

A communication device according to the present invention is a communication device that wirelessly communicates with a counterpart communication device in a full-duplex mode using orbital angular momentum, and includes a second interference cancellation circuit that generates a replica of an interference signal received together with one or more signals transmitted from the counterpart communication device, on the basis of one or more signals to be transmitted to the counterpart communication device, and subtracts the replica from a received signal.

10 Claims, 10 Drawing Sheets

(56) References Cited

U.S. PATENT DOCUMENTS

| | | |
|---|---|---|
| 2016/0315754 A1 | 10/2016 | Wu et al. |
| 2017/0062910 A1 | 3/2017 | Iida |
| 2019/0020434 A1 | 1/2019 | Adachi et al. |
| 2019/0028165 A1 | 1/2019 | Adachi et al. |
| 2020/0007235 A1 | 1/2020 | Ashrafi et al. |
| 2020/0228195 A1 | 7/2020 | Sasaki et al. |
| 2021/0111781 A1* | 4/2021 | Sasaki .................. H04B 7/0469 |
| 2021/0399766 A1* | 12/2021 | Zenkyu .................... H04B 1/10 |

FOREIGN PATENT DOCUMENTS

| | | |
|---|---|---|
| JP | 2017-517918 A | 6/2017 |
| JP | 2017-130791 A | 7/2017 |
| JP | 2017-130792 A | 7/2017 |
| JP | 2018-509819 A | 4/2018 |
| WO | WO 2015/159264 A1 | 10/2015 |
| WO | WO 2015/159808 A1 | 10/2015 |
| WO | WO 2016/127801 A1 | 8/2016 |
| WO | WO 2017/029765 A1 | 2/2017 |
| WO | WO 2019/059406 A1 | 3/2019 |

OTHER PUBLICATIONS

Bharadia et al., "Full Duplex Radios", ACM SIGCOMM Computer Communication Review, vol. 43, No. 4 ACM, 2013, total 12 pages.

Notification of Reason for Refusal issued in JP Patent Application No. 2019-519465 dated Jun. 30, 2020.

Zhang et al., "An Orbital Angular Momentum-Based Array for In-Band Full-Duplex Communications", IEEE Antennas and Wireless Propagation Letters, vol. 18, No. 3, Mar. 2019, p. 417-421.

Zhang et al., "An Orbital Angular Momentum-Based In-Band Full-Duplex Communication System and Its Mode Selection", IEEE Communications Letters, vol. 21, No. 5, May 2017, p. 1183-1186.

Zhang et al., "Analyses and Full-Duplex Applications of Circularly Polarized OAM Arrays Using Sequentially Rotated Configuration", IEEE Transactions on Antennas and Propagation, vol. 66, No. 12, Dec. 2018, p. 7010-7020.

* cited by examiner

COMMUNICATION DEVICE AND PROGRAM STORAGE MEDIUM

CROSS-REFERENCE TO RELATED APPLICATION

This application is a continuation application of International Application PCT/JP2019/039164, filed on Oct. 3, 2019, and designating the U.S., the entire contents of which are incorporated herein by reference.

BACKGROUND OF THE INVENTION

1. Field of the Invention

The disclosure relates to a communication device to perform communication in a full-duplex mode using orbital angular momentum, an interference signal generation circuit, a control circuit, an interference cancellation method, and a program storage medium.

2. Description of the Related Art

Attention has been directed to a wireless communication system that uses a new spatial multiplexing transmission scheme of orbital angular momentum (OAM). OAM is a type of physical quantity that represents a state of a radio wave in terms of a state of rotation of the phase on a plane perpendicular to the travelling direction. In wireless communication using the OAM, a radio wave is generated in such a manner as to provide a helical equiphase surface relative to the travel direction. The thus generated radio wave is called an OAM wave. The number of rotations of the phase of an OAM wave per wavelength is called an OAM mode. An OAM wave transmitted from a transmitting device is receivable by a receiving device that supports the same OAM mode as the OAM mode of the transmitted OAM wave. Since OAM waves having different OAM modes are orthogonal to one another, combining the plurality of OAM waves having the different OAM modes enables spatial division multiplexing (SDM) transmission. Spatial division multiplexing using the plurality of OAM waves having the different OAM modes is called OAM multiplexing. A receiving device separates signals OAM-multiplexed by a transmitting device, into signals in correspondence to the OAM modes used in the OAM multiplexing.

Among various methods of generating an OAM wave, a method using a uniform circular array (UCA) antenna is drawing great attention. This is because generating an OAM wave, using a UCA antenna enables transmitting and receiving OAM waves having various OAM modes, and thus provides wide application. In the case of OAM multiplexing using a UCA antenna, for example, a Butler matrix circuit provides each of transmission signals assigned to different OAM modes different with a phase rotation corresponding to the OAM mode of the transmission signal. These transmission signals subjected to the phase rotations are combined together, and the resulting signal is emitted as a radio wave from the UCA antenna.

A full-duplex wireless communication system using OAM has recently been proposed. Wireless communication using OAM utilizes the orthogonality of OAM multiplexing to thereby achieve a full-duplex wireless communication system capable of performing transmission and reception simultaneously using the same frequency. Japanese Patent Application Laid-open No. 2015-207799 discloses a full-duplex wireless communication system that utilizes the orthogonality of OAM multiplexing to perform transmission and reception simultaneously by using different OAM modes in transmission and reception at the same frequency.

The technology described in Japanese Patent Application Laid-open No. 2015-207799 above uses only the orthogonality of OAM multiplexing for separation between transmission and reception. In the case of simultaneous transmission and reception using the same frequency, in some case, a transmission signal transmitted from the communication device turns around into a receiving antenna, thereby causing self-interference. That is, when a first communication device to perform communication using OAM receives a signal from a second communication device, i.e., the communication counterpart, a signal transmitted from the first communication device to the second communication device can act as an interference signal. This interference signal is noise for the first communication device when the first communication device receives a signal. It is therefore desirable to reduce such an interference signal. Unfortunately, the use of only the orthogonality of OAM multiplexing for the separation between the transmission and the reception can fail to reduce the self-interference sufficiently. One possible method for reducing self-interference allows each communication device to generate a replica of the interference signal, and then subtract this replica from a received signal. However, Japanese Patent Application Laid-open No. 2015-207799 does not discloses any method for generating a replica of an interference signal.

SUMMARY OF THE INVENTION

A communication device according to the disclosure is a communication device for wirelessly communicating with another device in a full-duplex mode using orbital angular momentum, the communication device comprising: an interference cancellation circuit to generate a replica of an interference signal received together with one or more signals transmitted from the other device, on a basis of one or more transmission signals to be transmitted to the other device, and to subtract the replica from a received signal.

DETAILED DESCRIPTION OF THE PREFERRED EMBODIMENTS

A communication device, an interference signal generation circuit, a control circuit, an interference cancellation method, and a program storage medium according to embodiments of the disclosure will be described in detail below with reference to the drawings. Note that these embodiments are not intended to limit the scope of this disclosure.

First Embodiment

Figure 1:
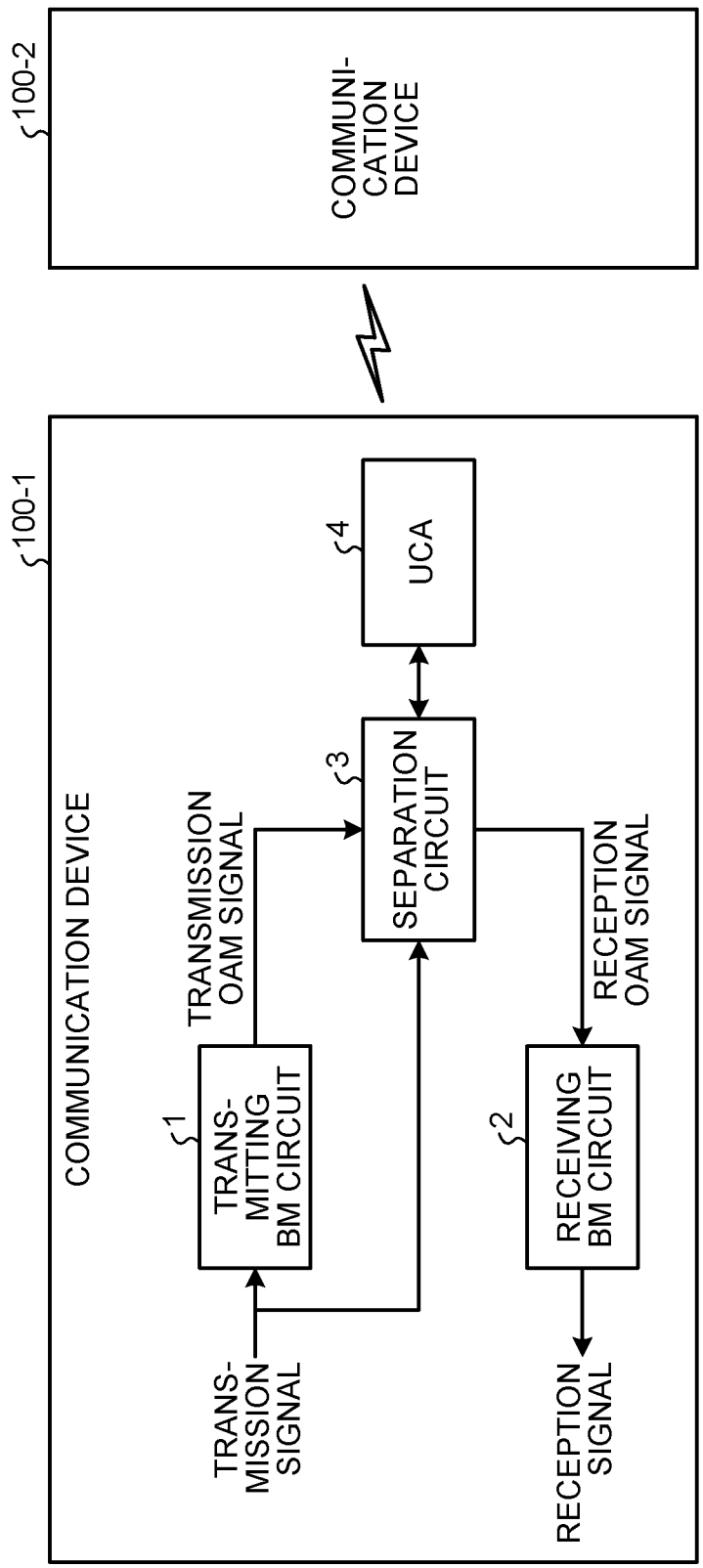
FIG. 1 is a diagram illustrating an example configuration of a communication device according to a first embodiment.

FIG. 1 is a diagram illustrating an example configuration of a communication device according to a first embodiment of the disclosure. A communication device 100-1 of the present embodiment includes a transmitting Butler matrix circuit (hereinafter referred to as transmitting BM circuit) 1, a receiving Butler matrix circuit (hereinafter referred to as receiving BM circuit) 2, a separation circuit 3, and a uniform circular array antenna (hereinafter referred to as UCA) 4. FIG. 1 also illustrates a communication device 100-2, which is the communication counterpart of the communication device 100-1.

The communication device 100-1 wirelessly communicates with another device in a full-duplex mode using orbital angular momentum (OAM). In more detail, the communication device 100-1 performs full-duplex wireless communication, which allows the communication device to perform transmission and reception simultaneously using the same frequency. Note that although the communication device 100-1 is capable of performing transmission and reception simultaneously using the same frequency, the communication device 100-1 does not need to always perform the transmission and the reception simultaneously, and can perform communication switching between a plurality of frequencies, for example. The communication device 100-2 is configured similarly to the communication device 100-1.

Figure 2:
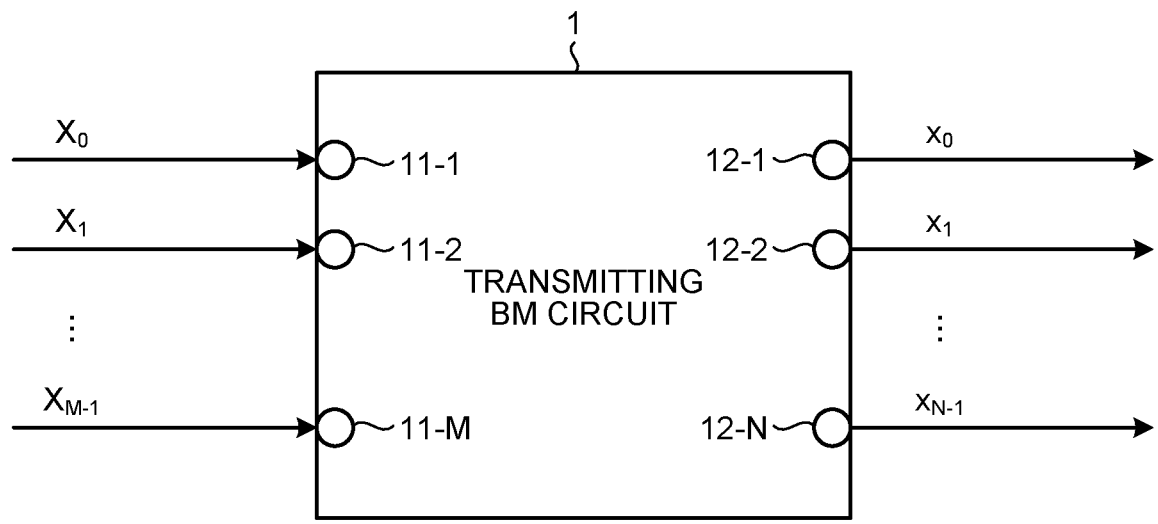
FIG. 2 is a diagram illustrating an example of input ports and output ports of a transmitting BM circuit of the first embodiment.

The transmitting BM circuit 1 includes a plurality of input ports and a plurality of output ports. The transmitting BM circuit 1 provides phase rotations for one or more transmission signals input from at least one of the multiple input ports, the phase rotations being different for the different input ports, and outputs the resulting signals. The transmitting BM circuit 1 provides one or more first transmission signals, which are the one or more transmission signals, with the phases to thereby generate a plurality of second transmission signals. FIG. 2 is a diagram illustrating an example of the input ports and the output ports of the transmitting BM circuit 1 of the present embodiment. As illustrated in FIG. 2, the transmitting BM circuit 1 includes input ports 11-1 to 11-M (where M is an integer equal to or greater than two) and output ports 12-1 to 12-N (where N is an integer equal to or greater than two). The input ports 11-1 to 11-M are an example of a plurality of input ports. The output ports 12-1 to 12-N are an example of a plurality of output ports. The number of input ports, i.e., M, corresponds to the maximum number of the transmission signals that can be multiplexed by the communication device 100-1. The input signals to, and the output signals from, the transmitting BM circuit 1 will be described later. The plurality of second transmission signals output from the individual output ports 12-1 to 12-N of the transmitting BM circuit 1 are each referred to also as transmission OAM signal.

The plurality of transmission OAM signals output from the transmitting BM circuit 1 are input to the UCA 4 via the separation circuit 3. The separation circuit 3 will be described later. The UCA 4 emits the transmission OAM signals input from the transmitting BM circuit 1, in the form of a radio wave. The UCA 4 includes a plurality of annularly arranged antenna elements. The UCA 4 includes the same number of the antenna elements as the number of the output ports of the transmitting BM circuit 1. As described above, the transmitting BM circuit 1 of the communication device 100-1 provides phase rotations for one or more transmission signals, after which the transmission signals thus provided with the phase rotations are transmitted as a radio wave from the UCA 4. The one or more transmission signals can be thus transmitted as an OAM wave. When a plurality of transmission signals is input to the individual input ports of the transmitting BM circuit 1, these transmission signals are OAM multiplexed. The method of OAM multiplexing using the Butler matrix circuit and the UCA is similar to a generally known method, and detailed description thereof will therefore be omitted.

The UCA 4 included in the communication device 100-1 of the present embodiment is a transceiver antenna used in both transmission and reception. That is, the UCA 4 is a dual-purpose uniform array antenna, which serves as both a transmission uniform array antenna and a reception uniform array antenna. The UCA 4 receives an OAM-multiplexed signal as a radio wave from the communication device 100-2 configured similarly to the communication device 100-1. The UCA 4 outputs the received signal to the separation circuit 3. As described above, the communication device 100-1 is capable of performing transmission and reception simultaneously using the same frequency, and the UCA 4, which is the transceiver antenna, is capable of simultaneously transmitting a radio wave and receiving a radio wave. For this reason, a transmission line connected to the UCA 4 to carry both a signal received by the UCA 4 and a transmission OAM signal. The separation circuit 3 separates a traveling wave and a reflected wave on the transmission line to thereby separate the signal received by the UCA 4 and the transmission OAM signal from each other. The separation circuit 3 outputs, to the UCA 4, the transmission OAM signal thus separated from the UCA-received signal. In addition, the separation circuit 3 subtracts a replica of an interference signal from each the signal received by each antenna element of the UCA 4 and separated from the transmission OAM signal, and outputs, to the receiving BM circuit 2, a reception OAM signal that is the signal having the replica subtracted. An operation of the separation circuit 3 will be described later in detail.

Figure 3:
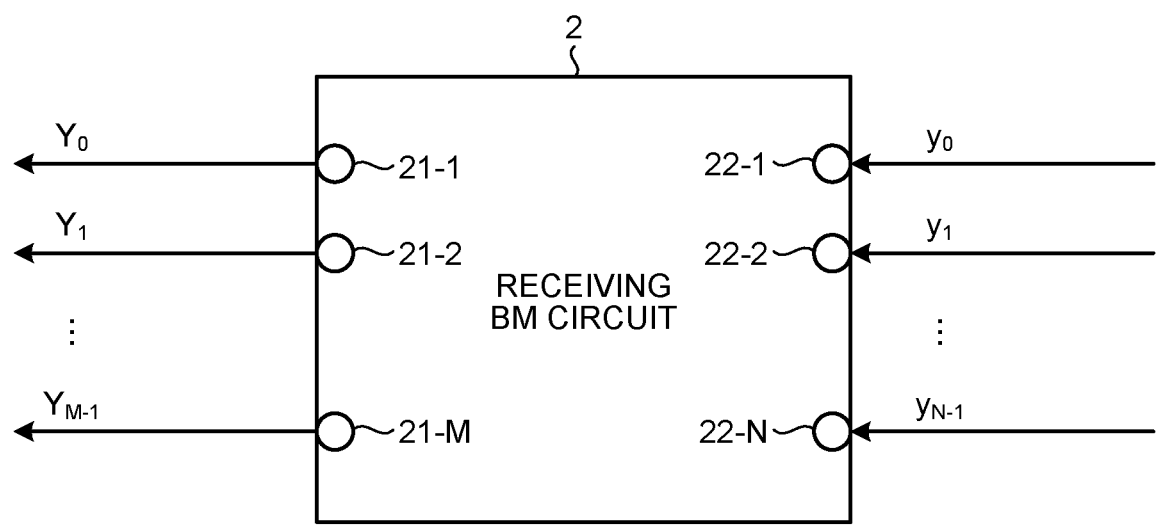
FIG. 3 is a diagram illustrating an example of input ports and output ports of a receiving BM circuit of the first embodiment.

The receiving BM circuit 2 includes a plurality of input ports and a plurality of output ports, and performs a reverse operation of the operation performed by the transmitting BM circuit 1. Thus, the receiving BM circuit 2 can separate the reception OAM signals that have been OAM multiplexed. That is, this enables the communication device 100-1 to obtain reception signals individually corresponding to the plurality of transmission signals that have been OAM multiplexed in the communication device 100-2. FIG. 3 is a diagram illustrating an example of the input ports and the output ports of the receiving BM circuit 2 of the present embodiment. As illustrated in FIG. 3, the receiving BM circuit 2 includes input ports 22-1 to 22-N, and output ports 21-1 to 21-M. The input ports 22-1 to 22-N are an example of a plurality of input ports, and the output ports 21-1 to 21-M are an example of a plurality of output ports. The receiving BM circuit 2 includes the same number of the input ports as the number of the output ports of the transmitting BM circuit 1, and the receiving BM circuit 2 incudes the same number of the output ports as the number of the input ports of the transmitting BM circuit 1. The method of separation of OAM-multiplexed signals using the UCA and the Butler matrix circuit is similar to a generally known method, and detailed description thereof will therefore be omitted.

Figure 4:
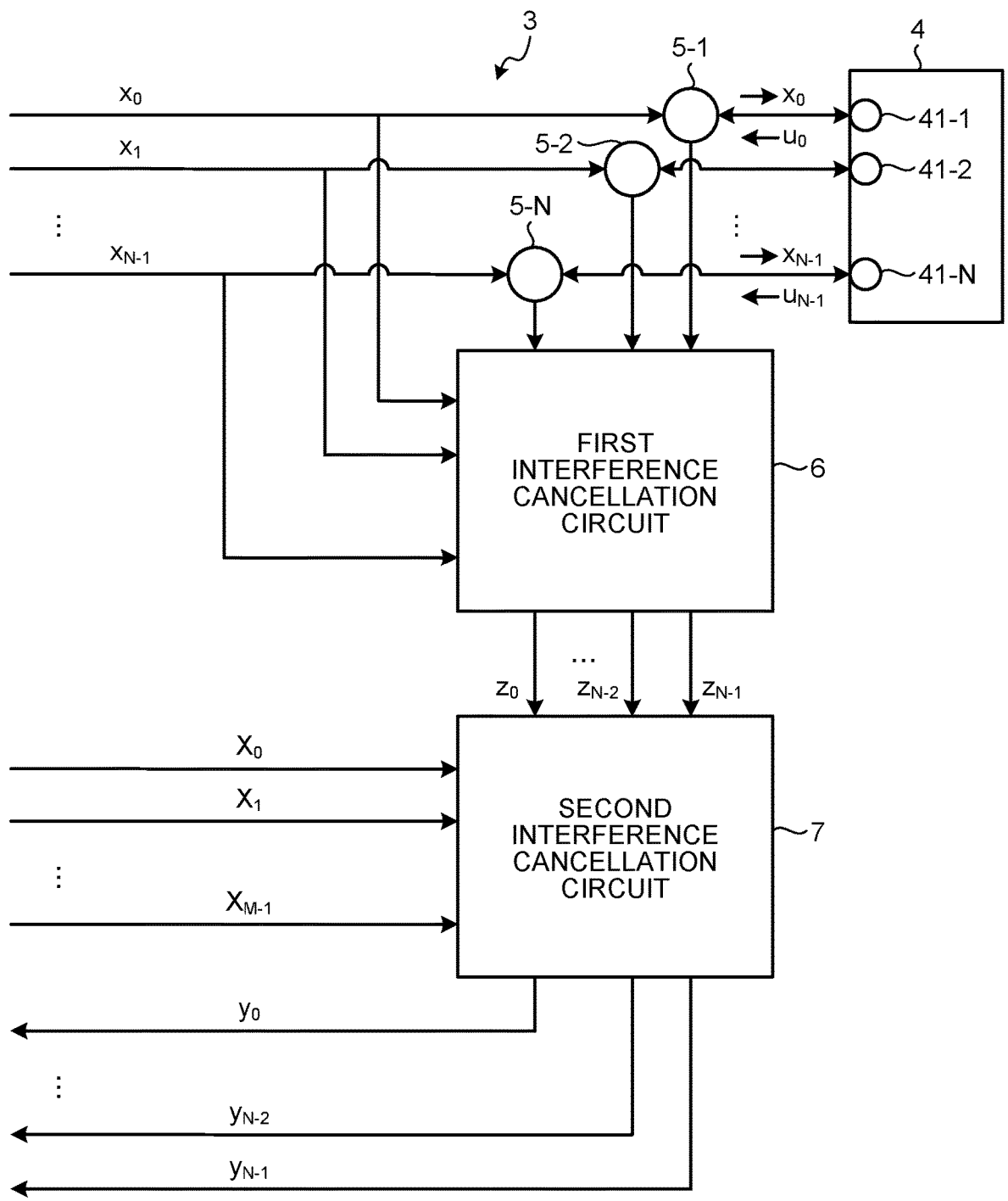
FIG. 4 is a diagram illustrating an example configuration of a separation circuit and of a UCA of the first embodiment.

The separation circuit 3 of the present embodiment will next be described. FIG. 4 is a diagram illustrating an example configuration of the separation circuit 3 and of the UCA 4 of the present embodiment. As illustrated in FIG. 4, the separation circuit 3 includes directional couplers 5-1 to 5-N, a first interference cancellation circuit 6, and a second interference cancellation circuit 7. The UCA 4 includes antenna elements 41-1 to 41-N.

Each of the transmission OAM signals output from the respective output ports 12-1 to 12-N of the transmitting BM circuit 1 is input to the corresponding one of the directional couplers 5-1 to 5-N, and also input to the first interference cancellation circuit 6. Each of the directional couplers 5-1 to 5-N is connected to the corresponding one of the antenna elements 41-1 to 41-N of the UCA 4 through transmission line. The directional coupler 5-$i$ ($i=1, 2, \ldots, N$) outputs, to the antenna element 41-$i$ of the UCA 4, the transmission OAM signal output from the output port 12-$i$ of the transmitting BM circuit 1. The transmission line between the antenna element 41-$i$ and the directional coupler 5-$i$ carries the signal received by the antenna element 41-$i$ and the signal output from the directional coupler 5-$i$ to the antenna element 41-$i$. The directional coupler 5-$i$ separates the traveling wave and the reflected wave on the corresponding transmission line to thereby separate the reception signal received by the antenna element 41-$i$ and the transmission OAM signal output to the antenna element 41-$i$ of the UCA 4, and then outputs, to the first interference cancellation circuit 6, the reception signal received by the antenna element 41-$i$. Each of the directional couplers 5-1 to 5-N, which is connected to the corresponding one of the antenna elements of the antenna elements 41-1 to 41-N, separates the transmission signal and the reception signal transmitted to and received from the corresponding transceiver antenna.

Interference cancelling in the present embodiment will now be described. With an OAM-using communication scheme, the communication device 100-1 of the present embodiment both transmits a first signal to the communication device 100-2, i.e., the communication counterpart, and receives a second signal from the communication device 100-2. The first signal is a signal OAM-multiplexed by the communication device 100-1, and the second signal is a signal OAM-multiplexed by the communication device 100-2. In some case, the communication device 100-1, which receives the second signal, experiences self-interference upon receiving the second signal and transmitting the first signal simultaneously. In the present embodiment, the separation circuit 3 has a function of reducing self-interference to thereby eliminate or reduce the effect of self-interference.

Examples of self-interference include intra-antenna interference and inter-antenna interference. The intra-antenna interference is a phenomenon where a signal transmitted from an antenna element affects that antenna element itself. The inter-antenna interference is a phenomenon where a signal transmitted from an antenna element affects another antenna element. Intra-antenna interference is caused by, for example, a signal being transmitted from an antenna element and received by that antenna element due to reflection, diffraction, and/or the like. Another example of intra-antenna interference is interference caused by a signal from a transmitting port of each of the directional couplers 5-1 to 5-N turning around into a receiving port of the directional coupler including that transmitting port because the ports of the individual directional couplers 5-1 to 5-N are insufficiently spaced apart. Note that the phrase "intra-antenna" not only means an inside of an antenna element itself, but means a system corresponding to a single antenna element, including the corresponding directional coupler. Inter-antenna interference is caused by, for example, a signal being transmitted from an antenna element and received by another antenna element. Inter-antenna interference is also caused when leakage between ports of the directional couplers 5-1 to 5-N causes a signal output from an directional coupler to turn around into another directional coupler.

Intra-antenna interference will be referred to hereinafter as first self-interference, and inter-antenna interference will be referred to hereinafter as second self-interference. The first self-interference affects reception operation in a case where an antenna is used in both transmission and reception. The second self-interference affects reception operation in both cases where an antenna for transmission and an antenna for reception are separately provided and where an antenna is used in both transmission and reception. In the present embodiment, the UCA 4 is a transceiver antenna, and therefore, the communication device 100-1 is affected by both the first self-interference and the second self-interference. Thus, the separation circuit 3 of the present embodiment has a function of reducing both the first self-interference and the second self-interference.

Using the transmission OAM signal input from the output port 12-$i$ of the transmitting BM circuit 1, the first interference cancellation circuit 6 cancels the first self-interference from the reception signal input from the directional coupler 5-$i$. Note that to reduce interference is also referred to hereinafter as to cancel interference. That is, to cancel interference not only means to completely eliminate the interference component, but also means to reduce interference. The first interference cancellation circuit 6 outputs, to the second interference cancellation circuit 7, N reception signals having the first self-interference cancelled.

An operation of the present embodiment and details of cancellation of the first self-interference and of cancellation of the second self-interference will next be described. The transmitting BM circuit 1 includes the input ports 11-1 to 11-M, as illustrated in FIG. 2. Let $X_0$ to $X_{M-1}$ denote in a one-to-one correspondence the M transmission signals each input to the corresponding one of the input ports 11-1 to 11-M. The input ports 11-1 to 11-M each correspond to one of the OAM modes different from one another. The transmission signal $X_m$ (m=0, 1, ..., M−1) is referred to herein as the transmission signal of the m-th OAM mode. In addition, let $x_0$ to $x_{N-1}$ denote, in a one-to-one correspondence, the transmission OAM signals each output from the corresponding one of the output ports 12-1 to 12-N of the transmitting BM circuit 1. The operation performed in the transmitting BM circuit 1 is equivalent to discrete Fourier transform operation, and an n-th transmission OAM signal $x_n$ (n=0, 1, ..., N−1) can be expressed by Equation (1) below, where j is the imaginary unit.

[Formula 1]

$$x_n = \sum_{m=0}^{M-1} e^{-j2\pi mn/N} X_m \qquad (1)$$

Note that the operation performed in the transmitting BM circuit 1 can also be expressed by Equation (2) below using a discrete Fourier transform matrix F.

[Formula 2]

$$\begin{bmatrix} x_0 \\ x_1 \\ \vdots \\ x_{N-1} \end{bmatrix} = F \begin{bmatrix} X_0 \\ \vdots \\ X_{M-1} \\ 0 \\ \vdots \\ 0 \end{bmatrix} \qquad (2)$$

The receiving BM circuit 2 includes the input ports 22-1 to 22-N and the output ports 21-1 to 21-M, as illustrated in FIG. 3. Let $y_0$ to $y_{N-1}$ denote, in a one-to-one correspondence, the M reception OAM signals each input to the corresponding one of the input ports 22-1 to 22-M of the receiving BM circuit 2. In addition, let $Y_0$ to $Y_{M-1}$ denote, in a one-to-one correspondence, the reception signals each output from the corresponding one of the output ports 21-1 to 21-M of the receiving BM circuit 2. The operation performed in the receiving BM circuit 2 is equivalent to inverse discrete Fourier transform operation, and a reception signal $Y_m$ (m=0, 1, ..., M−1) having an m-th OAM mode can be expressed by Equation (3) below. The reception signal $Y_m$ is a reception signal corresponding to the transmission signal having the m-th OAM mode transmitted from the communication device 100-2.

[Formula 3]

$$Y_m = \sum_{n=0}^{N-1} e^{j2\pi mn/N} y_n \qquad (3)$$

Note that the operation performed in the receiving BM circuit 2 can also be expressed by Equation (4) below using the discrete Fourier transform matrix F, where the right superscript H indicates a Hermitian conjugate.

[Formula 4]

$$\begin{bmatrix} Y_0 \\ \vdots \\ Y_{M-1} \\ 0 \\ \vdots \\ 0 \end{bmatrix} = \begin{bmatrix} 1 & & & 0 \\ & \ddots & & \\ & & 1 & \\ 0 & & & 0 \\ & \ddots & & \\ 0 & & & 0 \end{bmatrix} F^H \begin{bmatrix} y_0 \\ y_1 \\ \vdots \\ y_{N-1} \end{bmatrix} \qquad (4)$$

An operation of the separation circuit 3 will next be described. As illustrated in FIG. 4, the signals each received by the corresponding one of the antenna elements 41-1 to 41-N are referred to herein as reception OAM signals $u_0$ to $u_{N-1}$ in a one-to-one correspondence. The N transmission lines, which interconnect each of the antenna elements 41-1 to 41-N and the corresponding one of the directional couplers 5-1 to 5-N, carry individually the reception OAM signals $u_0$ to $u_{N-1}$ and the transmission OAM signals $x_0$ to $x_{N-1}$. Note that, for convenience of illustration, FIG. 4 omits illustrating the reception OAM signal $u_1$ and the transmission OAM signal $x_1$ corresponding to the antenna element 41-2.

As described above, the directional coupler 5-i separates the reception OAM signal $u_{i-1}$ received by the antenna element 41-i and the transmission OAM signal $x_{i-1}$ output to the antenna element 41-i, and outputs the reception OAM signal $u_{i-1}$ to the first interference cancellation circuit 6. The first interference cancellation circuit 6 is configured to cancel the first self-interference caused by each of the transmission OAM signals $x_0$ to $x_{N-1}$ each included in the corresponding one of the reception OAM signals output from the directional couplers 5-1 to 5-N. An interference signal in the first self-interference is referred to hereinafter as first interference signal. A first interference signal is an interference signal caused by each of the plurality of transmission signals transmitted from a corresponding one of the antenna elements 41-1 to 41-N that are a plurality of transceiver antenna elements, each of the transmission signals turning around into that corresponding one of the antenna elements 41-1 to 41-N.

An example of the first interference signal included in the reception OAM signal output from the directional coupler 5-i is the transmission OAM signal $x_{i-1}$ output from the transmitting BM circuit 1 through the directional coupler 5-i and the antenna element 41-i, input again to the directional coupler 5-i, and output from the directional coupler 5-i. The propagation channel of this transmission OAM signal $x_{i-1}$ is referred to as first interference propagation channel. The first interference propagation channel is a loopback channel in which a system providing reception operation of the antenna element 41-i receives the transmission OAM signal $x_{i-1}$ that should be transmitted from the antenna element 41-i. The first interference propagation channel is at least one of: a propagation channel through which the transmission OAM signal $x_{i-1}$ reflected and/or diffracted by the antenna element 41-i, for example, is received by the same antenna element 41-i; and a leakage propagation channel between ports in the directional coupler 5-i. The first interference signal included in the reception OAM signal output from the directional coupler 5-i is the transmission OAM signal $x_{i-1}$ having an amplitude and a phase that have changed by passing through the first interference propagation channel. The communication device 100-1 can therefore generate a replica (reproduction) of the first interference signal by adjusting the amplitude and the phase, of the transmission OAM signal $x_{i-1}$ in accordance with the transfer function of the first interference propagation channel.

In the present embodiment, the first interference cancellation circuit 6 of the separation circuit 3 generates replicas of the N first interference signals corresponding one-to-one to the transmission OAM signals $x_0$ to $x_{N-1}$, and subtracts these replicas from the signals input from the respective directional couplers 5-1 to 5-N. This enables the first interference cancellation circuit 6 to cancel the first self-interference.

Figure 5:
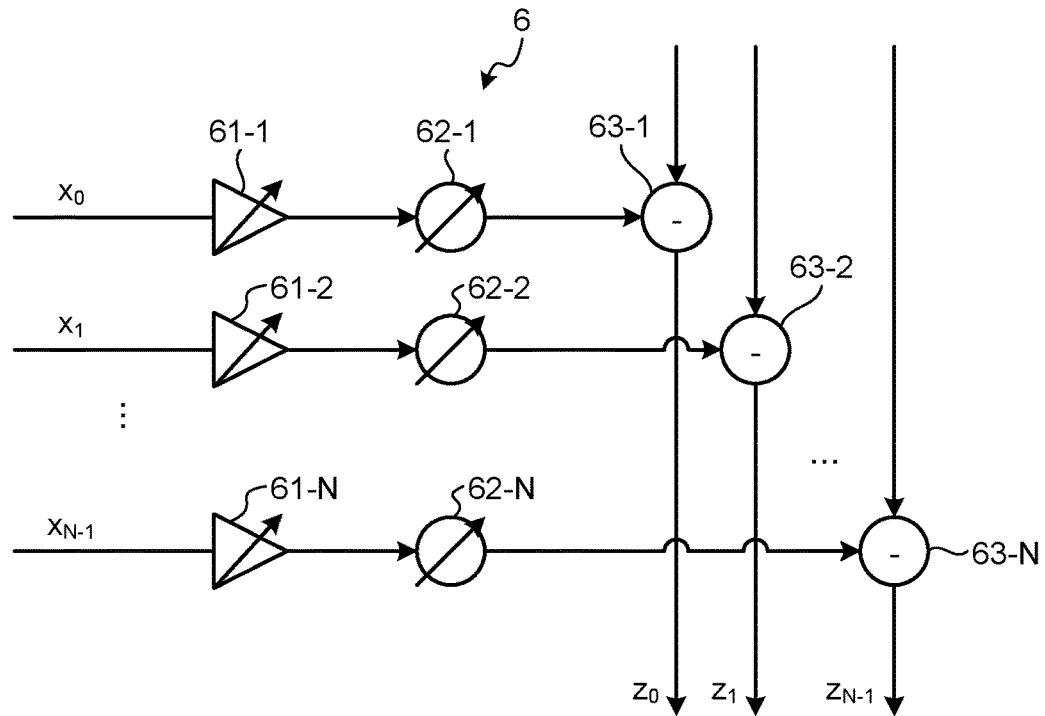
FIG. 5 is a diagram illustrating an example configuration of a first interference cancellation circuit of the first embodiment.

FIG. 5 is a diagram illustrating an example configuration of the first interference cancellation circuit 6 of the present embodiment. As illustrated in FIG. 5, the first interference cancellation circuit 6 includes variable amplifiers 61-1 to 61-N, variable phase shifters 62-1 to 62-N, and subtractors 63-1 to 63-N. The variable amplifiers 61-1 to 61-N are each an amplifier having a variable gain thereof. The variable phase shifters 62-1 to 62-N are each a phase shifter having a variable amount of phase shift. Each of the variable amplifiers 61-1 to 61-N amplifies the corresponding one of the amplitudes of the corresponding transmission OAM signals $x_0$ to $x_{N-1}$ on the basis of a set gain, and then output the amplified signal to the corresponding one of the variable phase shifters 62-1 to 62-N. Each of the variable phase shifters 62-1 to 62-N shifts the phase of the input signal by a set amount of phase shift, and then output the signals having the phase shifted, to the corresponding one of the subtractors 63-1 to 63-N. The value of the gain of each of the variable amplifiers 61-1 to 61-N and the amount of phase shift of each of the variable phase shifters 62-1 to 62-N are set in advance on the basis of changes in the amplitude and the phase in the first interference propagation channel. The signal output from each of the variable phase shifters 62-1 to 62-N to the corresponding one of the subtractors 63-1 to 63-N is the replica of the first interference signal. Note that the transfer function, that is, the changes in the amplitude and the phase, in the first interference propagation channel can be calculated on the basis of design values, or be obtained in advance through an experiment or the like.

Each of the subtractors 63-1 to 63-N subtracts the signal input from the corresponding one of the variable phase shifters 62-1 to 62-N, from the corresponding one of the signals output from the directional couplers 5-1 to 5-N, and outputs the result of subtraction to the second interference cancellation circuit 7. The signals output from the subtractors 63-1 to 63-N are referred to herein as reception OAM signals $z_0$ to $z_{N-1}$ in a one-to-one correspondence. The reception OAM signals $z_0$ to $z_{N-1}$ are each a signal obtained by subtraction of the replica of the first interference signal from the reception OAM signal output from the directional coupler 5-i.

The second interference cancellation circuit 7 will next be described. The second interference cancellation circuit 7 generates replicas of interference signals received together with one or more signals transmitted from another device, i.e., the communication device 100-2, on the basis of the transmission signals $X_0$ to $X_{M-1}$, i.e., one or more transmission signals to be transmitted to the other device, and then subtracts the replicas from received signals. Specifically, the second interference cancellation circuit 7 cancels second self-interference, i.e., inter-antenna interference from the reception OAM signals $z_0$ to $z_{N-1}$ input from the first interference cancellation circuit 6. An interference signal in the second self-interference is referred to hereinafter as second interference signal. A second interference signal is an interference signal provided by the transmission OAM signal transmitted from the antenna element 41-i and affecting the signal received by an antenna element 41-k (k≠i).

The reception OAM signal $z_{k-1}$ is received by the antenna element 41-k, and input to the second interference cancellation circuit 7 via the directional coupler 5-k and the first interference cancellation circuit 6. The second interference signal included in the reception OAM signal $z_{k-1}$ is, for example, the transmission OAM signal output from the transmitting BM circuit 1 through at least one of: one or more of the directional couplers 5-1 to 5-N; and one or more of the antenna elements 41-1 to 41-N, and output from a port of the directional coupler 5-k, which port is directed toward the first interference cancellation circuit 6. This transmission OAM signal output from the directional coupler 5-k is then input to the second interference cancellation circuit 7 via the first interference cancellation circuit 6. The propagation channel of this transmission OAM signal $x_{i-1}$ is referred to herein as second interference propagation channel. In some case, plural ones of the transmission OAM signals $x_0$ to $x_{N-1}$ are input to the second interference cancellation circuit 7 through their corresponding second interference propagation channels, and a sum of such plural transmission OAM signals thus input into the second interference cancellation circuit 7 is the second interference signal included in the reception OAM signal $z_{k-1}$.

The second interference propagation channel includes various types of propagation channels. One example of the second interference propagation channel is a line-of-sight communication channel in which the transmission OAM signal $x_{i-1}$ is transmitted as a radio wave from the antenna element 41-i, and is then received by another antenna element, e.g., the antenna element 41-k, without being affected by reflection, diffraction, or the like. Another example of the second interference propagation channel is a non-line-of-sight communication channel in which a transmission signal is affected by reflection, diffraction, and/or the like, and is then received by a receiving antenna. A non-line-of-sight communication channel will be subjected not only to distance attenuation dependent on the propagation distance, but also to attenuation in the signal level due to reflection, diffraction, and/or the like. In most cases, accordingly, the second interference signal is the transmission OAM signal $x_{i-1}$ that has passed through the line-of-sight communication channel providing no attenuation due to reflection, diffraction, and/or the like. Thus, the second interference cancellation circuit 7 of the present embodiment treats the transmission OAM signal having passed through the line-of-sight communication channel, as the second interference signal, and subtracts the replica of that second interference signal from the reception OAM signal $z_{k-1}$ to thereby cancel the second self-interference.

The transmission OAM signals $x_0$ to $x_{N-1}$ each included in the corresponding one of the reception OAM signals $z_0$ to $z_{N-1}$ and having through a line-of-sight communication channel can be expressed by Equation (5) below, where $y'_n$ of the left-hand side of Equation (5) represents a corresponding one of the transmission OAM signals $x_0$ to $x_{N-1}$ that is included in the reception OAM signal $z_n$ and has passed through a line-of-sight communication channel. Note that the hacek mark, or the wedge mark, in the equation is expressed by a superscript v in the text description. In addition, an element $h_{k,l}$ represents an impulse response in the line-of-sight communication channel between the antenna element 41-($l$+1) and the antenna element 41-($k$+1).

[Formula 5]

$$\begin{bmatrix} \check{y}_0 \\ \check{y}_1 \\ \vdots \\ \check{y}_{N-1} \end{bmatrix} = \begin{bmatrix} h_{0,0} & h_{0,1} & \cdots & h_{0,N-1} \\ h_{1,0} & h_{1,1} & \cdots & h_{1,N-1} \\ \vdots & \vdots & \ddots & \vdots \\ h_{N-1,0} & h_{N-1,1} & \cdots & h_{N-1,N-1} \end{bmatrix} \begin{bmatrix} x_0 \\ x_1 \\ \vdots \\ x_{N-1} \end{bmatrix} \qquad (5)$$

The element $h_{k,l}$ can be expressed by Equation (6) below.

[Formula 6]

$$h_{k,l} = \frac{\beta \lambda e^{-j\frac{2\pi}{\lambda} d_{k,l}}}{4\pi d_{k,l}} \qquad (6)$$

Note that $d_{k,l}$ represents the propagation distance between the antenna element 41-($l$+1) and the antenna element 41-($k$+1). Note that although the matrix of Equation (5) includes diagonal elements, that is, elements which correspond to the case in which an antenna element transmitting a signal and an antenna element receiving a signal are the same, the diagonal elements of the matrix of Equation (5) are zero because a propagation distance is zero. In addition, β represents an attenuation ratio and the amount of phase rotation common to all of the antenna elements 41-1 to 41-N, and λ represents the wavelengths of the radio waves transmitted by the antenna elements 41-1 to 41-N. Equation (6) shows that $h_{k,l}$ depends on the propagation distance between antenna elements.

Figure 6:
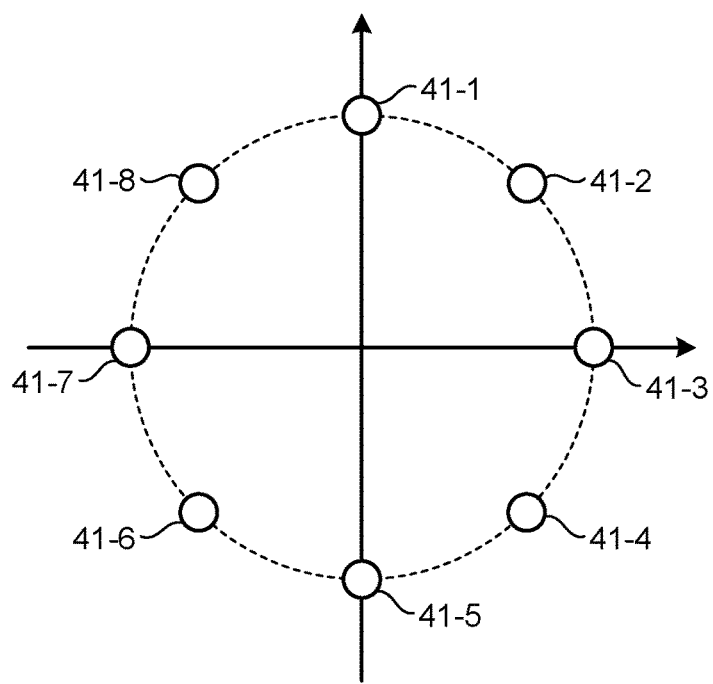
FIG. 6 is a diagram illustrating an example arrangement of antenna elements of the first embodiment.

The UCA 4 has the antenna elements 41-1 to 41-N circumferentially equidistantly arranged. In the present embodiment, each of the antenna elements 41-1 to 41-N serves as both a transmitting antenna element and a receiving antenna element. That is, the antenna elements 41-1 to 41-N are each a transceiver antenna element. FIG. 6 is a diagram illustrating an example arrangement of the antenna elements 41-1 to 41-N of the present embodiment. The example illustrated in FIG. 6 is where N is 8. As illustrated in FIG. 6, the antenna elements 41-1 to 41-8 are annularly arranged at equal angular spacings on the same plane. Since the antenna elements 41-1 to 41-8 are annularly arranged at the equal angular spacings on the same plane, propagation distances from one of the antenna elements 41-1 to 41-8 to the other ones of the antenna elements 41-1 to 41-8 remain the same regardless of whether which of the antenna elements 41-1 to 41-8 is that one antenna element.

Figure 7:
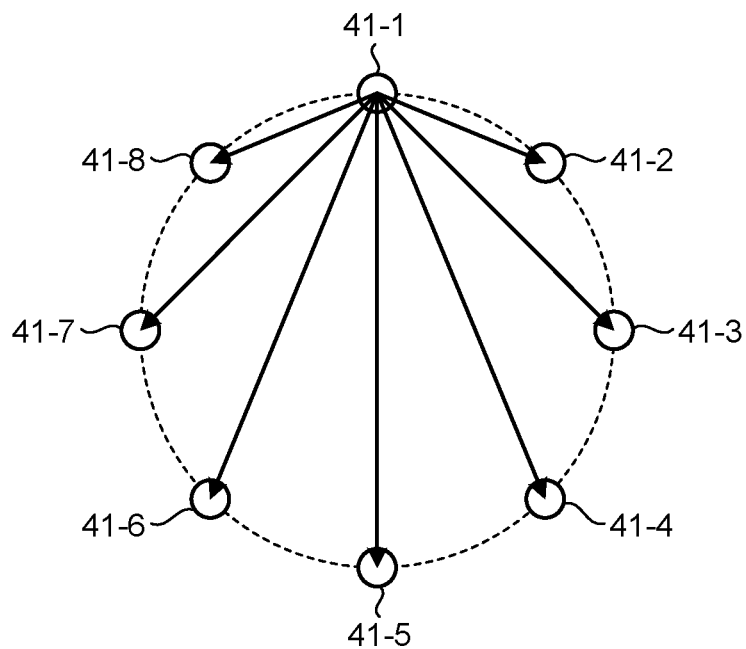
FIG. 7 is a diagram illustrating propagation distances between an antenna element that is a first antenna element and the other individual antenna elements of the first embodiment.
Figure 8:
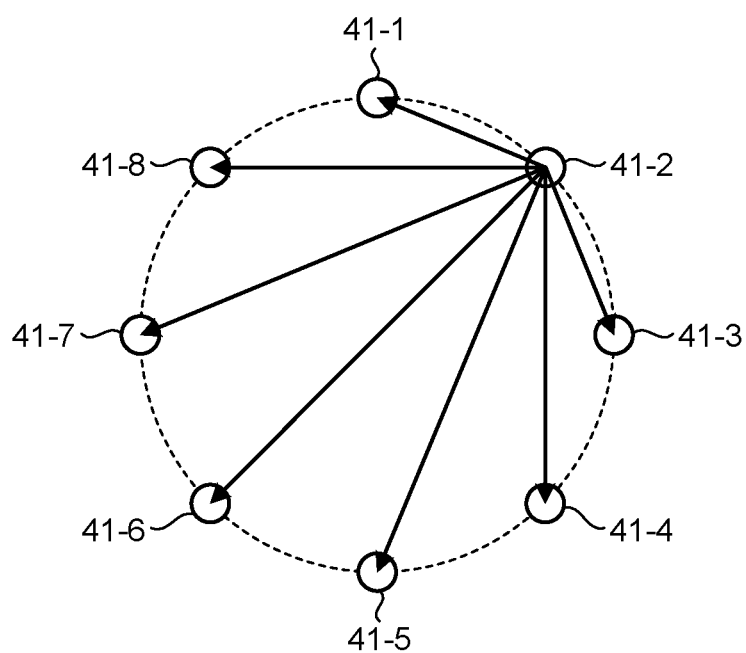
FIG. 8 is a diagram illustrating propagation distances between a second antenna element next to the first antenna element and the other individual antenna elements.

FIG. 7 is a diagram illustrating the propagation distances between the antenna element 41-1 and the other individual antenna elements 41-2 to 41-8. The antenna element 41-1 is a first antenna element of the present embodiment. FIG. 8 is a diagram illustrating the propagation distances between the antenna element 41-2 and the other individual antenna elements 41-1 and 41-3 to 41-8. The antenna element 41-2 is a second antenna element next to the first antenna element. FIGS. 8 and 7 illustrate propagation distances as the lengths of the arrows from the origins, i.e., the antenna element 41-1 or 41-2, to the other antenna elements. For example, FIG. 7 illustrates the propagation distance between the antenna element 41-1 and the antenna element 41-2 by the length of the arrow from the antenna element 41-1 to the antenna element 41-2. Although FIGS. 7 and 8 are different in the reference numerals denoting the antenna elements that are the origins of the arrows and the ends of the arrows, the antenna element that is the origin of the arrow of one of FIGS. 7 and 8 is rotated into agreement with the antenna element that is the origin of the arrow of the other of FIGS. 7 and 8, such that the arrows of FIG. 7 agree with the arrows of FIG. 8. The seven propagation distances from one antenna element of the antenna elements 41-1 to 41-8 to the other antenna elements of the antenna elements 41-1 to 41-8 will have same propagation distance values even when the origin antenna element changes.

Thus, the element $h_{k,l}$ can be expressed by Equation (7) below. When the relationship represented by Equation (7) is satisfied, the propagation channel matrix generated on the basis of the propagation distances of direct waves between each of the antenna elements 41-1 to 41-8 and each of the antenna elements 41-1 to 41-8, i.e., the matrix in the right-hand side of Equation (5), is said to have cyclic symmetry.

[Formula 8]

$$h_{k,l} = h_p, \; p = \begin{cases} N-(k-l), & \text{if } k-l \geq 0 \\ -(k-l), & \text{if } k-l < 0 \end{cases} \qquad (7)$$

Accordingly, the matrix in the right-hand side of Equation (5), i.e., a matrix $H_C$ representing the line-of-sight communication channel, can be expressed by the circulant matrix given in Equation (8) below.

[Formula 8]

$$H_C = \begin{bmatrix} h_0 & h_1 & \cdots & h_{N-1} \\ h_{N-1} & h_0 & \cdots & h_{N-2} \\ \vdots & \vdots & \ddots & \vdots \\ h_1 & h_2 & h_{N-1} & h_{01} \end{bmatrix} \qquad (8)$$

Since a circulant matrix is diagonalizable using a discrete Fourier transform matrix, a diagonal matrix $H_D$ can be obtained as shown by Equation (9) below.

[Formula 9]

$$H_D = F^H H_C F = \begin{bmatrix} H_0 & & 0 \\ & \ddots & \\ 0 & & H_{N-1} \end{bmatrix} \qquad (9)$$

Thus, the second interference signals can be expressed by Equation (10) below.

[Formula 10]

$$\begin{bmatrix} \breve{y}_0 \\ \breve{y}_1 \\ \vdots \\ \breve{y}_{N-1} \end{bmatrix} = \begin{bmatrix} h_{0,0} & h_{0,1} & \cdots & h_{0,N-1} \\ h_{1,0} & h_{1,1} & \cdots & h_{1,N-1} \\ \vdots & \vdots & \ddots & \vdots \\ h_{N-1,0} & h_{N-1,1} & \cdots & h_{N-1,N-1} \end{bmatrix} \begin{bmatrix} x_0 \\ x_1 \\ \vdots \\ x_{N-1} \end{bmatrix} \quad (10)$$

$$= \begin{bmatrix} h_{0,0} & h_{0,1} & \cdots & h_{0,N-1} \\ h_{1,0} & h_{1,1} & \cdots & h_{1,N-1} \\ \vdots & \vdots & \ddots & \vdots \\ h_{N-1,0} & h_{N-1,1} & \cdots & h_{N-1,N-1} \end{bmatrix} F \begin{bmatrix} X_0 \\ \vdots \\ X_{M-1} \\ 0 \\ \vdots \\ 0 \end{bmatrix}$$

$$= F \begin{bmatrix} H_0 & & 0 \\ & \ddots & \\ 0 & & H_{N-1} \end{bmatrix} \begin{bmatrix} X_0 \\ \vdots \\ X_{M-1} \\ 0 \\ \vdots \\ 0 \end{bmatrix}$$

$$= F \begin{bmatrix} H_0 & & 0 & & \\ & \ddots & & 0 & \\ 0 & & H_{N-1} & & \\ & 0 & & 0 & 0 \\ & & 0 & \ddots & \\ & & & 0 & 0 \end{bmatrix} \begin{bmatrix} X_0 \\ \vdots \\ X_{M-1} \\ 0 \\ \vdots \\ 0 \end{bmatrix}$$

Equation (10) shows that multiplication of the transmission signals X0 to XM-1 by the diagonal matrix HD and subsequent application of discrete Fourier transform to the result of the multiplication yields the second interference signals. From Equations (5) to (8), the diagonal matrix HD can be calculated in accordance with the propagation distances of the second interference propagation channels. The second interference cancellation circuit 7 can generate replicas of the second interference signals by changing the amplitudes and the phases of the individual transmission signals X0 to XM-1 in accordance with the matrix corresponding to the second interference propagation channels, and then applying discrete Fourier transform to the result of changing the amplitudes and the phases. That is, the second interference cancellation circuit 7 generates replicas of the second interference signals on the basis of: the propagation channel matrix generated on the basis of the propagation distances of direct waves between each of the antenna elements 41-1 to 41-N and each of the antenna elements 41-1 to 41-N; and the transmission signals X0 to $X_{M-1}$. Note that the propagation channel matrix can be calculated on the basis of the propagation distances of direct waves, that is, design values, or be generated by measurement through an experiment. For example, the propagation channel matrix can be obtained by transmitting a test signal from one of the antenna elements and allowing the individual antenna elements to receive the signal. Since, described above, the operation performed in a Butler matrix circuit is similar to discrete Fourier transform, it becomes possible to cancel second self-interference with a simple circuit configuration as the second interference cancellation circuit 7 performs discrete Fourier transform using a Butler matrix circuit.

Figure 9:
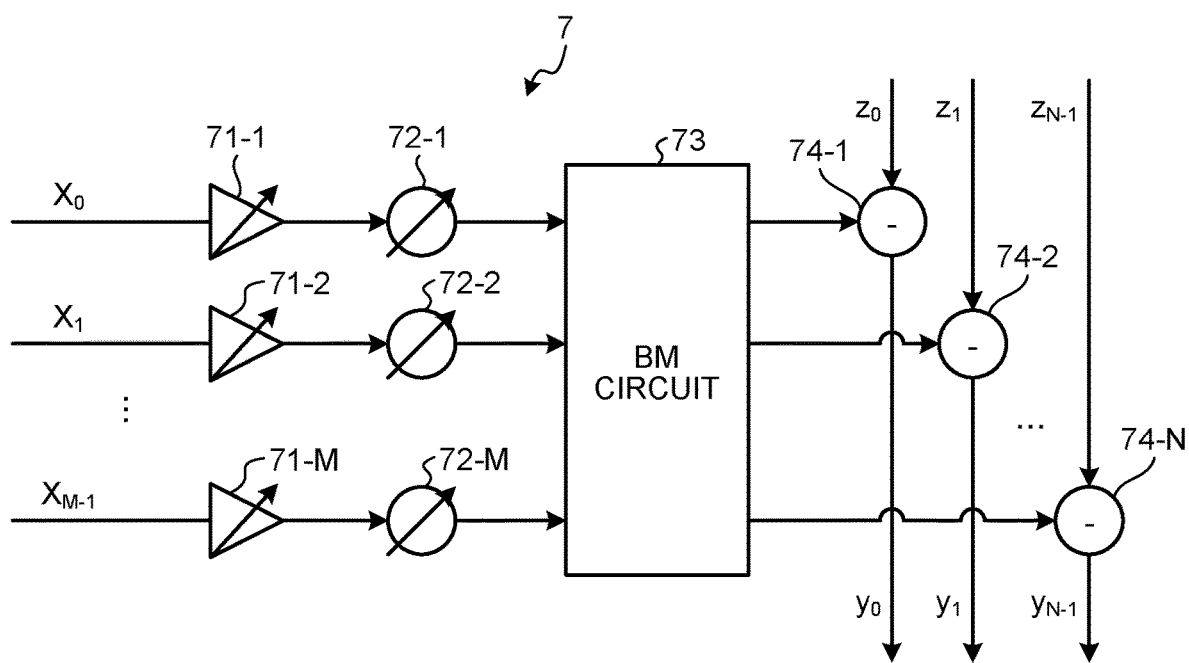
FIG. 9 is a diagram illustrating an example configuration of a second interference cancellation circuit of the first embodiment.

FIG. 9 is a diagram illustrating an example configuration of the second interference cancellation circuit 7 of the present embodiment. As illustrated in FIG. 9, the second interference cancellation circuit 7 includes variable amplifiers 71-1 to 71-M, variable phase shifters 72-1 to 72-M, a Butler matrix circuit (hereinafter referred to, using an abbreviation, as BM circuit) 73, and subtractors 74-1 to 74-N.

Note that, as described above, the number M is the maximum number of transmission signals that can be OAM multiplexed, and one or more of practically input transmission signals $X_0$ to $X_{M-1}$ suffices. It is therefore only required that one or more of the variable amplifiers 71-1 to 71-M adjust the amplitudes of the individual transmission signals $X_0$ to $X_{M-1}$ that are one or more first transmission signals. Also, it is only required that one or more of the variable phase shifters 72-1 to 72-M adjust the phases of the individual transmission signals $X_0$ to $X_{M-1}$ having the amplitudes adjusted by the one or more of the variable amplifiers 71-1 to 71-M.

The variable amplifiers 71-1 to 71-M are each an amplifier having a variable gain thereof. The variable phase shifters 72-1 to 72-M are each a phase shifter having a variable amount of phase shift. Each of the variable amplifiers 71-1 to 71-M has its gain set in accordance with the corresponding element of the diagonal matrix $H_D$. Each of the variable phase shifters 72-1 to 72-M has its amount of phase shift set in accordance with the corresponding element of the diagonal matrix $H_D$. Each of the variable amplifiers 71-1 to 71-M amplifies the amplitude of the corresponding one of the transmission signals $X_0$ to $X_{M-1}$ on the basis of the set gain, and outputs the amplified signal to the corresponding one of the variable phase shifters 72-1 to 72-M. Each of the variable phase shifters 72-1 to 72-M shifts the phase of the input signal, by the set amount of phase shift, and outputs, to the BM circuit 73, the signal having the phase shifted.

Similarly to the transmitting BM circuit 1, the BM circuit 73 includes M input ports and N output ports. The BM circuit 73 can use a circuit having the same configuration as the configuration of the transmitting BM circuit 1. The BM circuit 73 performs an operation similar to discrete Fourier transform on M signals input from the individual variable phase shifters 72-1 to 72-M, generates N signals, and outputs each of the N signals to the corresponding one of the subtractors 74-1 to 74-N. The signals output from the BM circuit 73 to the subtractors 74-1 to 74-N are replicas of the second interference signals. That is, the BM circuit 73 generates replicas of the second interference signals by providing the phases for one or more of the transmission signals $X_0$ to $X_{M-1}$ having the phases adjusted by one or more of the variable phase shifters 72-1 to 72-M. Each of the subtractors 74-1 to 74-N subtracts the replica of the second interference signal from the corresponding one of the reception OAM signals $z_0$ to $z_{N-1}$, and outputs, to the receiving BM circuit 2, the results of the subtraction as the reception OAM signals $y_0$ to $y_{N-1}$.

Note that the configurations of the first interference cancellation circuit 6 and of the second interference cancellation circuit 7 are not limited to the configurations in the foregoing example. At least one of the first interference cancellation circuit 6 and the second interference cancellation circuit 7 can be implemented in software. That is, at least one of the first interference cancellation circuit 6 and the second interference cancellation circuit 7 can be implemented by execution of a program describing an operation of at least one of the first interference cancellation circuit 6 and the second interference cancellation circuit 7. Note that since the second interference signals are generated using the variable amplifiers 71-1 to 71-M, the variable phase shifters 72-1 to 72-M, and the BM circuit 73, as illustrated in FIG. 9, it becomes possible to generate the interference signals with a simple circuit configuration.

The present embodiment has been described giving the example in which both the first interference signals and the second interference signals are generated using the first interference cancellation circuit 6 and the second interference cancellation circuit 7 to reduce the effects of both of interference signals. However, the communication device 100-1 can include only one of the first interference cancellation circuit 6 and the second interference cancellation circuit 7. Of the first interference cancellation circuit 6 and the second interference cancellation circuit 7, the communication device 100-1 only includes the second interference cancellation circuit 7, in which case the second interference cancellation circuit 7 serves as the interference cancellation circuit. Alternatively, in a case in which the communication device 100-1 includes the first interference cancellation circuit 6 and the second interference cancellation circuit 7, the first interference cancellation circuit 6 and the second interference cancellation circuit 7 can be considered a single interference cancellation circuit.

Note that the variable amplifiers 61-1 to 61-N and the variable phase shifters 62-1 to 62-N define an interference signal generation circuit in the first interference cancellation circuit 6. In addition, the variable amplifiers 71-1 to 71-M, the variable phase shifters 72-1 to 72-M, and the BM circuit 73 define an interference signal generation circuit in the second interference cancellation circuit 7.

As described above, in the present embodiment, the communication device 100-1, which both transmits a first signal to a communication counterpart and receives a second signal from the communication counterpart, with an OAM-using communication scheme, includes an interference signal generation circuit. The interference signal generation circuit generates a replica of an interference signal caused by the first signal, on the basis of: a transmission OAM signal that is the first signal; or on a transmission signal from which the transmission OAM signal originates. This enables the communication device 100-1 to generate a replica of an interference signal caused by the first signal. The communication device 100-1 then subtracts the replica of the interference signal from a reception OAM signal. Thus, the communication device 100-1 can reduce interference.

Second Embodiment

Figure 10:
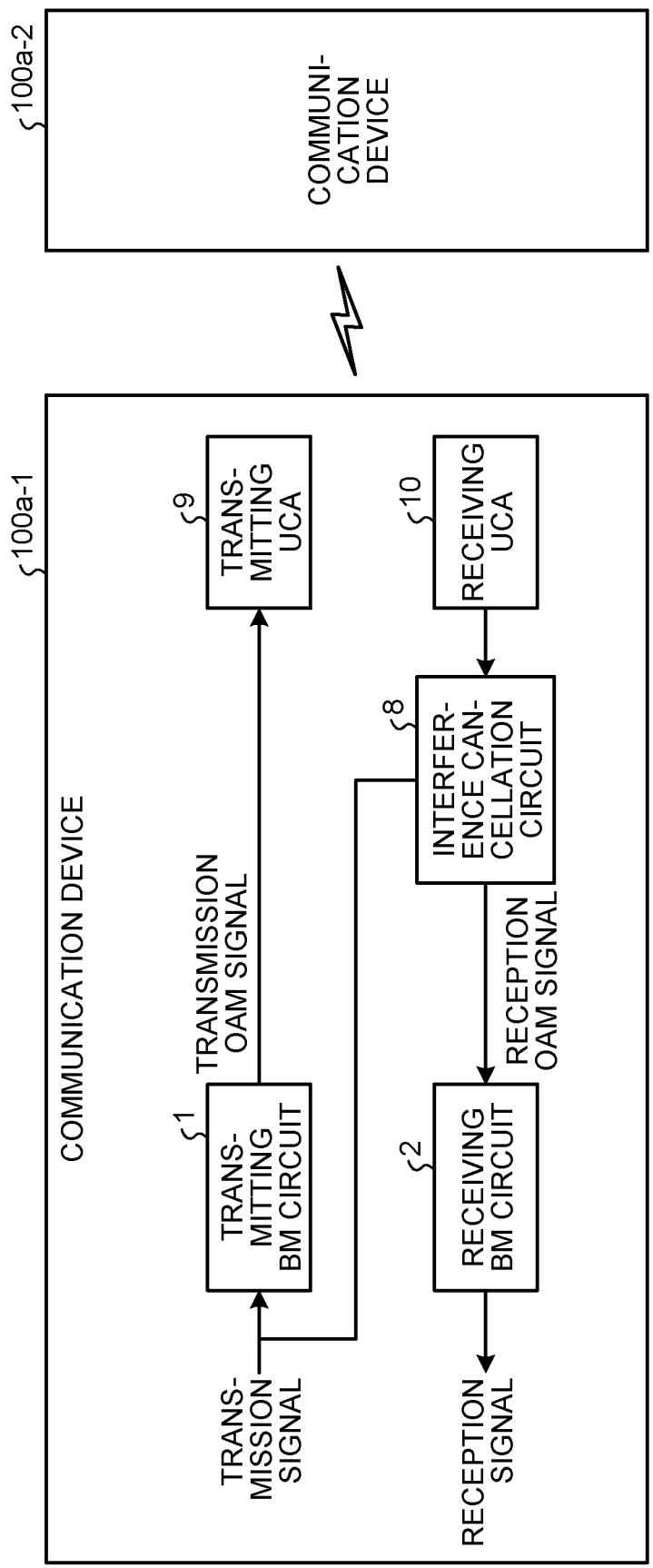
FIG. 10 is a diagram illustrating an example configuration of a communication device according to a second embodiment.

FIG. 10 is a diagram illustrating an example configuration of a communication device according to a second embodiment of the disclosure. The first embodiment has been described giving the example in which the antenna is used for both transmission and reception. In contrast, the present embodiment will be described giving an example that uses an antenna for transmission and an antenna for reception, separately.

A communication device 100a-1 of the present embodiment includes the transmitting BM circuit 1 similar to that of the first embodiment, the receiving BM circuit 2 similar to that of the first embodiment, an interference cancellation circuit 8, a transmitting UCA 9, and a receiving UCA 10. FIG. 10 also illustrates a communication device 100a-2, which is the communication counterpart of the communication device 100a-1. The communication device 100a-2 is configured similarly to the communication device 100a-1. Similarly to the first embodiment, with both using an OAM-using communication scheme, the communication device 100a-1 both transmits a first signal to the communication device 100a-2, which is the communication counterpart, and receives a second signal from the communication counterpart. Elements each having a function similar to the function of the first embodiment are designated by the same reference characters as used in the first embodiment, and description thereof will therefore be omitted. Differences from the first embodiment will be primarily described below.

Similarly to the UCA 4 of the first embodiment, the transmitting UCA 9 and the receiving UCA 10 each include a plurality of antenna elements that are circumferentially equidistantly arranged. A transmission OAM signal output from the transmitting BM circuit 1 is input to the transmitting UCA 9, and is emitted as a radio wave from the transmitting UCA 9. In the present embodiment, the communication device 100a-1, which includes an antenna for transmission and an antenna for reception, separately, eliminates the necessity of separating a transmission signal and a reception signal, using the directional couplers 5-1 to 5-N as performed in the first embodiment. Thus, the communication device 100a-1 does not include the separation circuit 3. In the present embodiment, the communication device 100a-1 includes the interference cancellation circuit 8 downstream of the receiving UCA 10 to cancel, from the reception signals, interference caused by the first signals that are signals transmitted from the transmitting UCA 9. The signals received by the receiving UCA 10 are input to the interference cancellation circuit 8.

Figure 11:
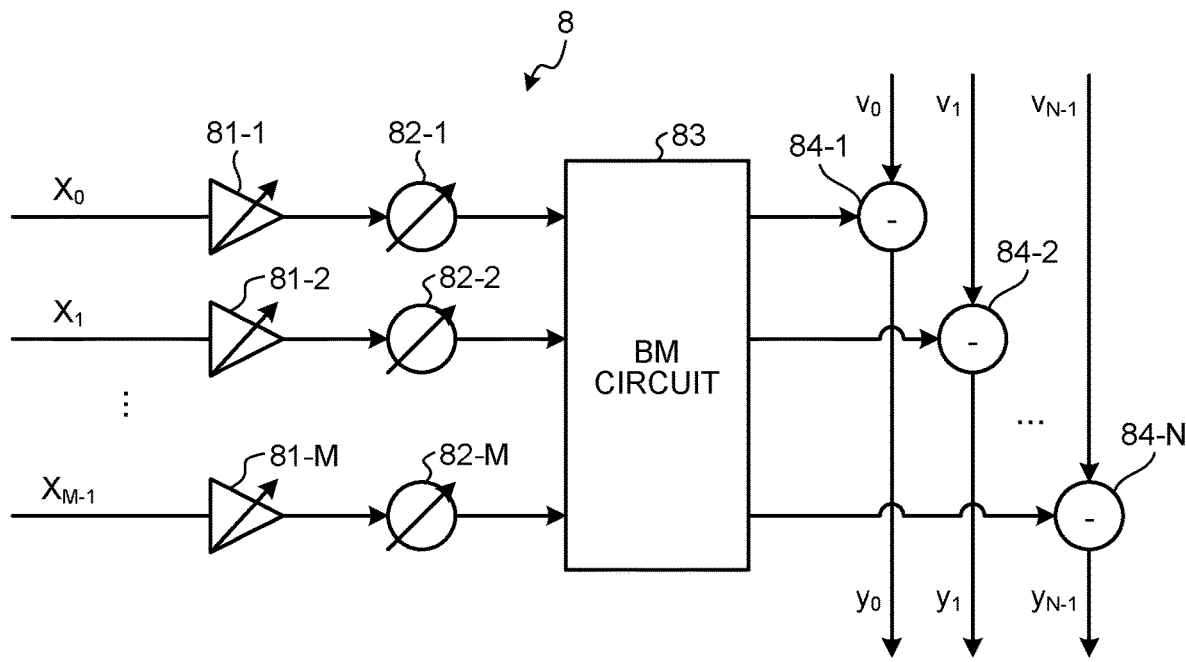
FIG. 11 is a diagram illustrating an example configuration of an interference cancellation circuit of the second embodiment.

FIG. 11 is a diagram illustrating an example configuration of the interference cancellation circuit 8 of the present embodiment. In the present embodiment, even when a signal transmitted from the transmitting UCA 9 is received by the transmitting UCA 9 due to diffraction, reflection, and/or the like, such a signal has no direct effect on signal reception by the receiving UCA 10. In addition, since the communication device 100a-1 does not include the directional couplers 5-1 to 5-N, it is not necessary to take into consideration a signal turning around between transmitting and receiving ports of each of the directional couplers 5-1 to 5-N. Of the first self-interference and the second self-interference described in the first embodiment, therefore, the first self-interference need not be taken into consideration in the present embodiment.

In the present embodiment, second self-interference occurs in which a signal transmitted from a certain antenna element affects another antenna element. However, the second self-interference of the present embodiment is not interference within the same UCA 4 as in the first embodiment, but interference between the transmitting UCA 9 and the receiving UCA 10. Thus, the method of calculating a propagation distance between antenna elements that should be considered differs partly from the method of the first embodiment, but the self-interference can be canceled using a method similar to the method of cancellation of the second self-interference of the first embodiment.

As illustrated in FIG. 11, the interference cancellation circuit 8 includes variable amplifiers 81-1 to 81-M, variable phase shifters 82-1 to 82-M, a Butler matrix circuit (hereinafter referred to as BM circuit) 83, and subtractors 84-1 to 84-N. The variable amplifiers 81-1 to 81-M are each an amplifier having a variable gain thereof. The variable phase shifters 82-1 to 82-M are each a phase shifter having a variable amount of phase shift.

The diagonal matrix $H_D$ can be calculated also in the present embodiment, taking a line-of-sight communication channel into consideration as in the first embodiment. Although the transmitting UCA 9 and the receiving UCA 10 are separately provided in the present embodiment, the antenna elements included in the transmitting UCA 9 and the antenna elements included in the receiving UCA 10 are concentrically arranged, such that the propagation distances can be expressed circularly, as in the first embodiment.

Figure 12:
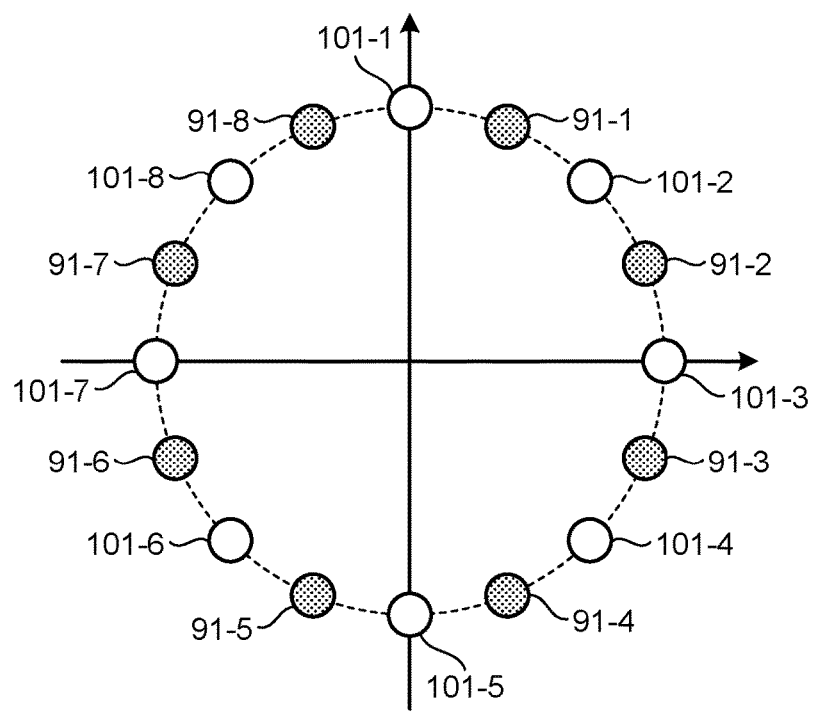
FIG. 12 is a diagram illustrating an example configuration of a transmitting UCA and a receiving UCA of the second embodiment.

FIG. 12 is a diagram illustrating an example configuration of the transmitting UCA 9 and the receiving UCA 10 of the present embodiment. In FIG. 12, the transmitting UCA 9 and the receiving UCA 10 each include N antenna elements, where N is eight. The transmitting UCA 9 includes antenna elements 91-1 to 91-8 that are an example of a plurality of transmitting antenna elements. The receiving UCA 10 includes antenna elements 101-1 to 101-8 that are an example of a plurality of receiving antenna elements. The antenna elements 91-1 to 91-8 are equidistantly circumferentially arranged on a first circle. The antenna elements 101-1 to 101-8 are equidistantly circumferentially arranged on the first circle on which the antenna elements 91-1 to 91-8 are arranged.

As illustrated in FIG. 12, the antenna element 91-1 is disposed between the antenna element 101-1 and the antenna element 101-2. The antenna elements 101-1 to 101-8 are each disposed between two adjacent antenna elements of the antenna elements 91-1 to 91-8 in an equally spaced relation to those two transmitting antenna elements. For example, the antenna element 91-1 is disposed in such a manner that the circumferential spacing between the antenna element 91-1 and the antenna element 101-1 is equal to the circumferential spacing between the antenna element 91-1 and the antenna element 101-2. As a result, the plurality of propagation distances from the antenna element 91-1 to the individual antenna elements 101-1 to 101-8 are equal to the plurality of propagation distances from the antenna element 91-2 to the individual antenna elements 101-1 to 101-8 though the corresponding antenna elements are denoted by different reference numerals. Thus, the propagation distances can be expressed circularly as in the first embodiment. That is, the element $h_{k,l}$ of the matrix of Equation (5) of the first embodiment is applied to the line-of-sight communication channel from the antenna element 91-($l$+1) to the antenna element 101-($k$+1), thereby enabling the matrix representing the line-of-sight communication channels to be expressed using a circulant matrix as in the first embodiment. Note, however, that the diagonal elements of the matrix of Equation (5) in the present embodiment are associated with the case in which the antenna element transmitting a signal differs from the antenna element receiving the signal, and the diagonal elements are therefore not zero. As described above, although the propagation distances of the present embodiment differ from the propagation distances of the first embodiment, the diagonal matrix $H_D$ can be calculated also in the present embodiment using a method similar to the method of the first embodiment.

Each of the variable amplifiers 81-1 to 81-M has its gain set in accordance with the corresponding element of the diagonal matrix $H_D$. Each of the variable phase shifters 82-1 to 82-M has its amount of phase shift set in accordance with the corresponding element of the diagonal matrix $H_D$. Each of the variable amplifiers 81-1 to 81-M amplifies the amplitude of the corresponding one of the transmission signals $X_0$ to $X_{M-1}$ on the basis of the set gain, and outputs the amplified signal to the corresponding one of the variable phase shifters 82-1 to 82-M. Each of the variable phase shifters 82-1 to 82-M shifts the phase of the input signal by the set amount of phase shift, and outputs, to the BM circuit 83, the signal having the phase shifted.

Similarly to the BM circuit 73, the BM circuit 83 includes M input ports and N output ports. The BM circuit 83 performs an operation similar to discrete Fourier transform on M signals input from the individual variable phase shifters 82-1 to 82-M, generates N signals, and outputs each of the N signals to the corresponding one of the subtractors 84-1 to 84-N. The signals output from the BM circuit 83 to the subtractors 84-1 to 84-N are replicas of interference signals of the present embodiment. Each of the subtractors 84-1 to 84-N subtracts the replica of the corresponding interference signal from the corresponding one of the reception OAM signals $v_0$ to $v_{N-1}$ input from the individual antenna elements 101-1 to 101-N, and outputs, to the receiving BM circuit 2, the results of subtraction as the reception OAM signals $y_0$ to $y_{N-1}$.

In the present embodiment, the variable amplifiers 81-1 to 81-M, the variable phase shifters 82-1 to 82-M, and the BM circuit 83 define an interference signal generation circuit.

As described above, in the present embodiment, the communication device 100*a*-1 including the UCA for transmission and the UCA for reception separately generates interference signals, using a method similar to the method of generating the second interference signals of the first embodiment. This enables the communication device 100*a*-1 to generate a replica of an interference signal caused by the first signal. The antenna elements 91-1 to 91-N of the transmitting UCA 9 and the antenna elements 101-1 to 101-N of the receiving UCA 10 are alternately arranged at equal angular spacings on the same circle. Since the variable amplifiers 81-1 to 81-M, the variable phase shifters 82-1 to 82-M, and the BM circuit 83 define an interference signal generation circuit, similarly to the second interference cancellation circuit 7 of the first embodiment, it becomes possible to generate an interference signal with a simple circuit configuration.

Third Embodiment

A third embodiment according to the disclosure will next be described. The communication device 100*a*-1 of the present embodiment is configured similarly to the second embodiment except that the antenna elements of the transmitting UCA 9 and the receiving UCA 10 are arranged differently from those in the second embodiment. Elements each having a function similar to the function of the second embodiment are designated by the same reference characters as used in the second embodiment, and description thereof will therefore be omitted. Differences from the second embodiment will be primarily described below.

The second embodiment has been described giving the example in which the antenna elements 91-1 to 91-N of the transmitting UCA 9 and the antenna elements 101-1 to 101-N of the receiving UCA 10 are arranged at equal angular spacings on the same circle. In the present embodiment, the set of the antenna elements 91-1 to 91-N of the transmitting UCA 9 and the set of the antenna elements 101-1 to 101-N of the receiving UCA 10 are each arranged on a corresponding one of circles having radiuses different from each other.

Figure 13:
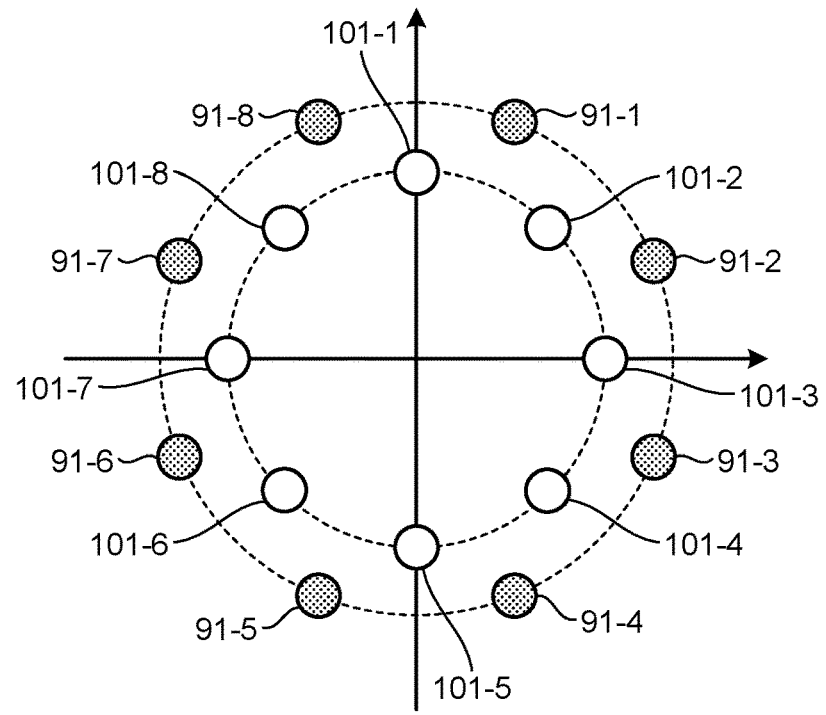
FIG. 13 is a diagram illustrating an example arrangement of the antenna elements of each of a transmitting UCA and a receiving UCA of a third embodiment.

FIG. 13 is a diagram illustrating an example arrangement of the antenna elements of each of the transmitting UCA 9 and the receiving UCA 10 of the present embodiment. The antenna elements 91-1 to 91-8 are equidistantly circumferentially arranged on a first circle. The antenna elements 101-1 to 101-8 are equidistantly circumferentially arranged on a second circle having a radius smaller than the radius of the first circle on which the antenna elements 91-1 to 91-8 are arranged, the second circle being concentric with the first circle. In the present embodiment, the set of the antenna elements 91-1 to 91-8 and the set of the antenna elements 101-1 to 101-8 are each circumferentially arranged on the corresponding one of the concentric circles having different radiuses, in which case the plurality of propagation distances from one of the antenna elements 91-1 to 91-8 of the transmitting UCA 9 to the individual antenna elements 101-1 to 101-8 of the receiving UCA 10 are equal to the plurality of propagation distances from another antenna element of the antenna elements 91-1 to 91-8 of the transmitting UCA 9 to the individual antenna elements 101-1 to 101-8 of the receiving UCA 10, as in the second embodiment.

The diagonal matrix $H_D$ can accordingly be calculated as in the second embodiment. The interference cancellation circuit 8 is configured and operates in the same manner as described in the second embodiment except that the gains set in the individual variable amplifiers 81-1 to 81-M and the amounts of phase shift set in the individual variable phase shifters 82-1 to 82-M differ depending on the arrangement of the antenna elements.

Figure 14:
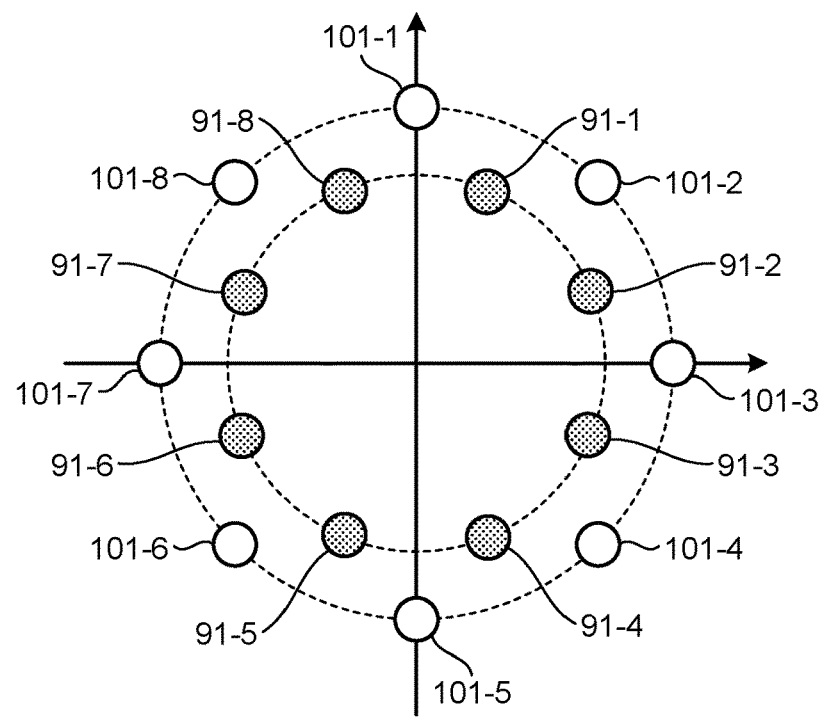
FIG. 14 is a diagram illustrating another example arrangement of the antenna elements of each of the transmitting UCA and the receiving UCA of the third embodiment.

FIG. 14 is a diagram illustrating another example arrangement of the antenna elements of each of the transmitting UCA 9 and the receiving UCA 10 of the present embodiment. The antenna elements 91-1 to 91-8 are equidistantly circumferentially arranged on the first circle. The antenna elements 101-1 to 101-8 are arranged at equal angular spacings on a second circle having a radius larger than the radius of the first circle on which the antenna elements 91-1 to 91-8 are arranged, the second circle being concentric with the first circle. In the present embodiment, the antenna elements 101-1 to 101-8 are arranged at the equal angular spacings on the concentric circle having the radius larger than the circle on which the antenna elements 91-1 to 91-8 are arranged, in which case the plurality of propagation distances from one of the antenna elements 91-1 to 91-8 of the transmitting UCA 9 to the individual antenna elements 101-1 to 101-8 of the receiving UCA 10 are equal to the plurality of propagation distances from another antenna element of the antenna elements 91-1 to 91-8 of the transmitting UCA 9 to the individual antenna elements 101-1 to 101-8 of the receiving UCA 10, as in the example of FIG. 13. The diagonal matrix $H_D$ can accordingly be calculated similarly to the second embodiment.

Note that the arrangement illustrated in FIG. 12 described in the second embodiment and the arrangements illustrated in FIGS. 13 and 14 described in the present embodiment are each an example of arrangement that allows the line-of-sight communication channels to be represented circularly. The interference cancellation method described in the second embodiment is also applicable to, in addition to these example arrangements, arrangements provided that the propagation channel matrix of line-of-sight communication channels can be represented by Equation (7) above as the arrangements allows the line-of-sight communication channels to be represented circularly. Note that when the propagation channels between the antenna elements 91-1 to 91-8 of the transmitting UCA 9 and the antenna elements 101-1 to 101-8 of the receiving UCA 10 satisfy the relationship represented by Equation (7) above, those propagation channels are said to have cyclic symmetry.

As described above, in the present embodiment, the set of the antenna elements 91-1 to 91-N of the transmitting UCA 9 and the set of the antenna elements 101-1 to 101-N of the receiving UCA 10 are each circumferentially arranged on the corresponding one of the concentric circles having the different radiuses. This configuration can provide an advantage similar to the advantage provided in the second embodiment.

Figure 15:
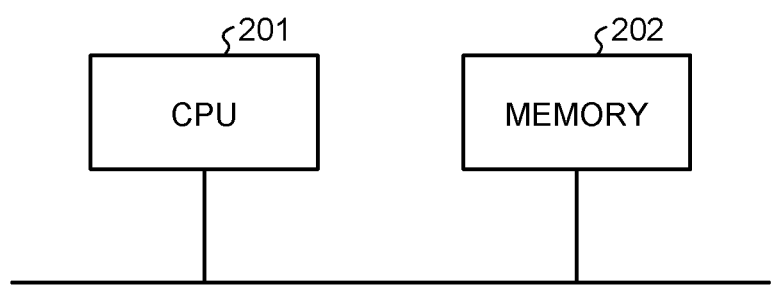
FIG. 15 is a diagram illustrating an example configuration of processing circuitry in a case in which the processing circuitry of each embodiment includes a central processing unit (CPU).

The circuits described in the foregoing embodiments are each processing circuitry, and can each be dedicated hardware, or processing circuitry including a processor, such as a CPU, that executes a program stored in a memory. The processing circuitry is also referred to as a control circuit. FIG. 15 is a diagram illustrating an example configuration of processing circuitry in a case in which the processing circuitry of each embodiment includes a CPU. In the example illustrated in FIG. 15, the processing circuitry includes a CPU 201 and a memory 202. In a case in which at least one of the circuits described in the foregoing embodiments is implemented in the processing circuitry illustrated in FIG. 15, the operation of this at least one circuit is described as a program. The function of this at least one circuit is then implemented by the CPU 201 executing the program stored in the memory 202. This program can be provided in a program storage medium or by a communication medium. The circuits described in the foregoing embodiments can be implemented partly in dedicated hardware and partly in the processing circuitry illustrated in FIG. 15.

For example, this program causes the communication device 100-1 or the communication device 100a-1 to perform a first step of generating a replica of an interference signal received together with one or more signals transmitted from another device, on the basis of one or more signals to be transmitted to the another device, and a second step of subtracting the replica from a received signal.

For example, at least one of the interference signal generation circuits included in the first interference cancellation circuit 6 and in the second interference cancellation circuit 7 described in the first embodiment can be implemented in dedicated hardware or implemented in the processing circuitry illustrated in FIG. 15. In addition, the interference signal generation circuit included in the interference cancellation circuit 8 described in the second embodiment can be implemented in dedicated hardware or implemented in the processing circuitry illustrated in FIG. 15.

A communication device according to the disclosure is a communication device using an OAM-using communication scheme to both transmit a first signal to a communication counterpart and receive a second signal from the communication counterpart, and the communication device according to the disclosure provides an advantage of generating a replica of an interference signal caused by the first signal.

The configurations described in the foregoing embodiments are merely examples. These configurations may be combined with a known other technology, and moreover, a part of such configurations may be omitted and/or modified without departing from the spirit.

What is claimed is:

1. A communication device for wirelessly communicating with another device in a full-duplex mode using orbital angular momentum, the communication device comprising:
    a transmitting Butler matrix circuit to generate a plurality of second transmission signals by providing phases for one or more first transmission signals;
    a transmitting uniform circular array antenna including a plurality of transmitting antenna elements to transmit each of the plurality of second transmission signals;
    a receiving uniform circular array antenna comprising a plurality of receiving antenna elements; and
    an interference cancellation circuit to generate a replica of an interference signal received together with one or more signals transmitted from the other device, on a basis of a propagation channel matrix and the one or more first transmission signals, and to subtract the replica from a received signal, the propagation channel matrix being generated on the basis of a propagation distance of a direct wave between each of the plurality of transmitting antenna elements and each of the plurality of receiving antenna elements.

2. The communication device according to claim 1, wherein the plurality of transmitting antenna elements and the plurality of receiving antenna elements are individually arranged to make the propagation channel matrix circularly symmetric.

3. The communication device according to claim 2, wherein
the interference cancellation circuit comprises
one or more variable amplifiers to adjust an amplitude of each of the one or more first transmission signals,
one or more variable phase shifters to adjust a phase of each of the one or more first transmission signals having amplitudes adjusted by the one or more variable amplifiers,
a Butler matrix circuit to generate a plurality of replicas by providing phases for the one or more first transmission signals having phases adjusted by the one or more variable phase shifters, and
a plurality of subtractors to subtract each of the replicas from a corresponding one of a plurality of reception signals received by the plurality of individual receiving antenna elements.

4. The communication device according to claim 2, wherein
the transmitting uniform circular array antenna and the receiving uniform circular array antenna serve as a single dual-purpose circular array antenna including a plurality of transceiver antenna elements,
the communication device comprises
a plurality of directional couplers each connected to a corresponding transceiver antenna of the transceiver antenna elements to separate a transmission signal and a reception signal in the corresponding transceiver antenna,
the interference cancellation circuit
generates a replicas of an internal interference signal associated with each of the plurality of transceiver antenna elements, and subtracts the replica of the internal interference signal from a corresponding one of the plurality of separated reception signals provided by the plurality of directional couplers, and
the internal interference signal is an interference signal generated by each of a plurality of transmission signals transmitted from a corresponding one of the plurality of transceiver antenna elements and turning around into the corresponding one of the transceiver antenna elements.

5. The communication device according to claim 2, wherein
the plurality of transmitting antenna elements are equidistantly circumferentially arranged on a first circle,
the plurality of receiving antenna elements are equidistantly circumferentially arranged on the first circle, and
the plurality of receiving antenna elements are each disposed between two adjacent transmitting antenna elements of the plurality of transmitting antenna elements in an equally spaced relation to the two adjacent transmitting antenna elements.

6. The communication device according to claim 2, wherein
the plurality of transmitting antenna elements are equidistantly circumferentially arranged on a first circle,
the plurality of receiving antenna elements are equidistantly circumferentially arranged on a second circle having a radius smaller than a radius of the first circle, the second circle being concentric with the first circle.

7. The communication device according to claim 2, wherein
the plurality of transmitting antenna elements are equidistantly circumferentially arranged on a first circle,
the plurality of receiving antenna elements are equidistantly circumferentially arranged on a second circle having a radius larger than a radius of the first circle, the second circle being concentric with the first circle.

8. An interference signal generation circuit to generate a replica of an interference signal in a communication device, the communication device including: a transmitting Butler matrix circuit to generate a plurality of second transmission signals by providing phases for one or more first transmission signals; a transmitting uniform circular array antenna including a plurality of transmitting antenna elements to transmit each of the plurality of second transmission signals; and a receiving uniform circular array antenna including a plurality of receiving antenna elements, the communication device wirelessly communicating with another device in a full-duplex mode using orbital angular momentum, wherein
the interference signal generation circuit generates the replica on a basis of a propagation channel matrix and the one or more first transmission signals, the propagation channel matrix being generated on the basis of a propagation distance of a direct wave between each of the plurality of transmitting antenna elements and each of the plurality of receiving antenna elements.

9. The interference signal generation circuit according to claim 8, comprising:
one or more variable amplifiers to adjust an amplitude of each of the one or more first transmission signals;
one or more variable phase shifters to adjust a phase of each of the one or more first transmission signal having amplitudes adjusted by the one or more variable amplifiers; and
a Butler matrix circuit to generate a plurality of replicas by providing phases for the one or more first transmission signals having phases adjusted by the one or more variable phase shifters.

10. A non-transitory storage medium to store a program to be executed by a communication device to communicate with another device using orbital angular momentum, the communication device comprising:
a transmitting Butler matrix circuit to generate a plurality of second transmission signals by providing phases for one or more first transmission signals;
a transmitting uniform circular array antenna including a plurality of transmitting antenna elements to transmit each of the plurality of second transmission signals; and
a receiving uniform circular array antenna comprising a plurality of receiving antenna elements, wherein
the program causes the communication device to perform:
generating a replica of an interference signal received together with one or more signals transmitted from the other device, on a basis of a propagation channel matrix and the one or more first transmission signals, the propagation channel matrix being generated on the basis of a propagation distance of a direct wave between each of the plurality of transmitting antenna elements and each of the plurality of receiving antenna elements; and
subtracting the replica from a received signal.

* * * * *